United States Patent [19]
Persson

[15] 3,635,005
[45] Jan. 18, 1972

[54] MUSHROOM HARVESTER
[72] Inventor: Sverker P. E. Persson, University Park, Pa.
[73] Assignee: Research Corporation, New York, N.Y.
[22] Filed: June 18, 1970
[21] Appl. No.: 47,330

[52] U.S. Cl. .............................................56/327 R, 56/155
[51] Int. Cl. ......................................................A01d 45/00
[58] Field of Search......................56/327, 327 A, 13.1, 13.2, 56/328, 330, 155, 158

[56] References Cited

UNITED STATES PATENTS

| | | | |
|---|---|---|---|
| 1,255,051 | 1/1918 | Radke | 56/155 |
| 2,741,888 | 4/1956 | Hamel et al. | 56/13.1 |
| 1,717,409 | 6/1929 | Riza | 56/13.2 |
| 1,041,650 | 10/1912 | McComb | 56/13.1 |

FOREIGN PATENTS OR APPLICATIONS 826,056  9/1967  U.S.S.R..............................56/327 R

Primary Examiner—Louis G. Mancene
Assistant Examiner—J. N. Eskovitz
Attorney—Stowell & Stowell

[57] ABSTRACT

A harvester for mushrooms having an open-ended, generally tunnellike housing within which is provided a cutter blade for severing the mushrooms stalks close to the surface of the ground is provided. Means are also provided for directing at least one stream of air adjacent the base of the mushroom being severed and further suction means are mounted in association with the housing for conveying the severed product to collection means as relative motion between the housing and the product is brought about.

4 Claims, 8 Drawing Figures

INVENTOR.
SVERKER P. E. PERSSON

BY
ATTORNEYS

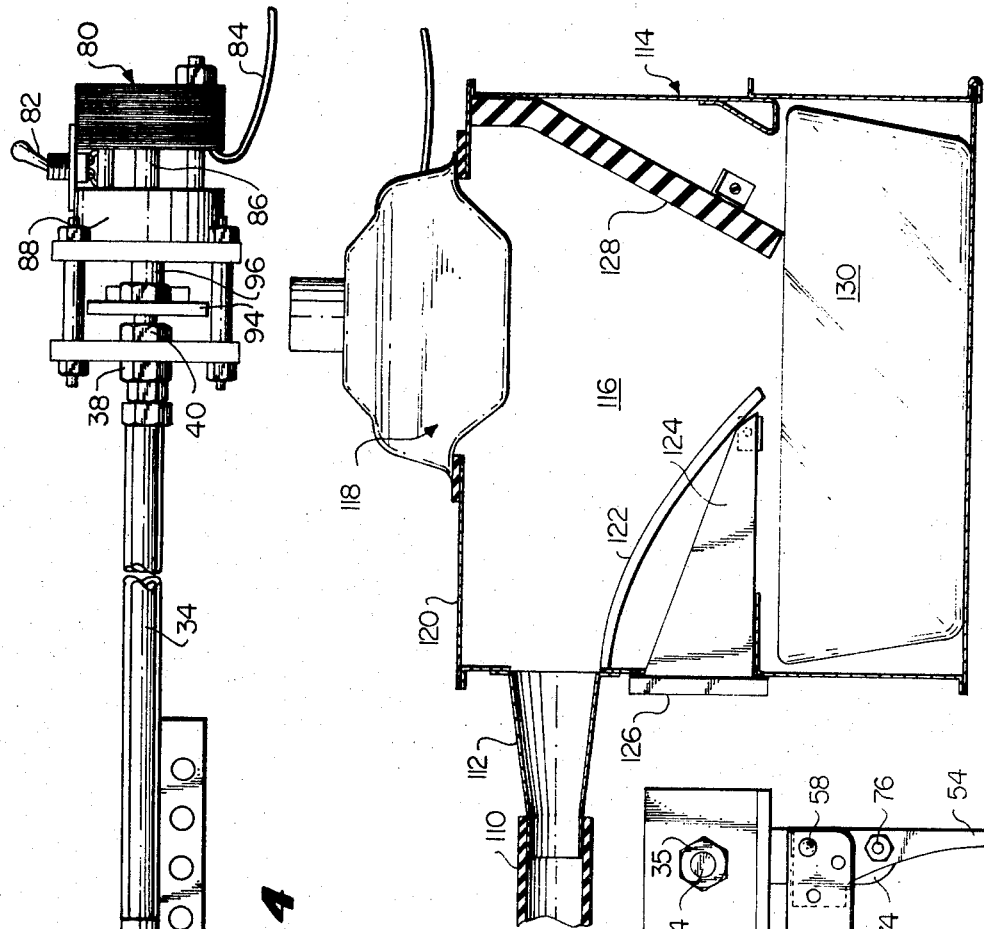
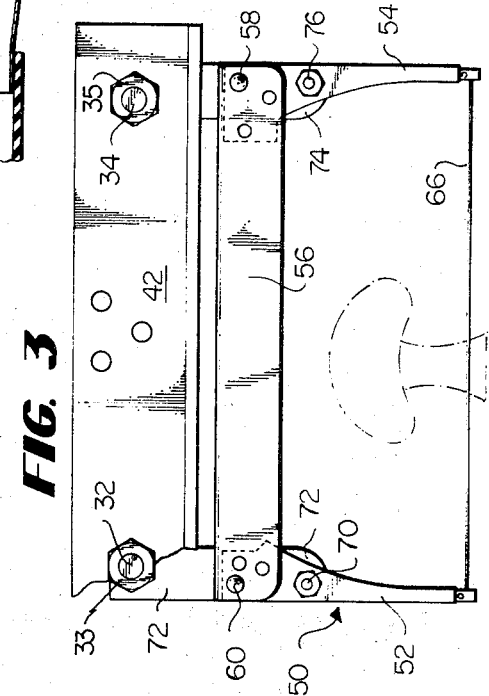

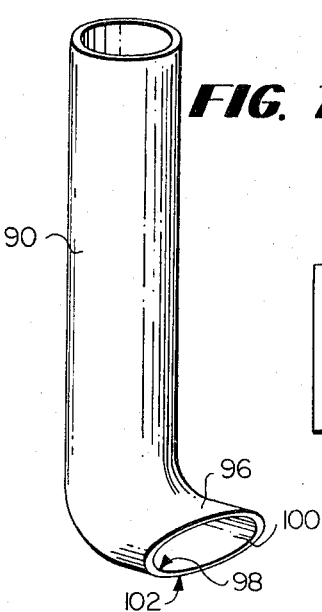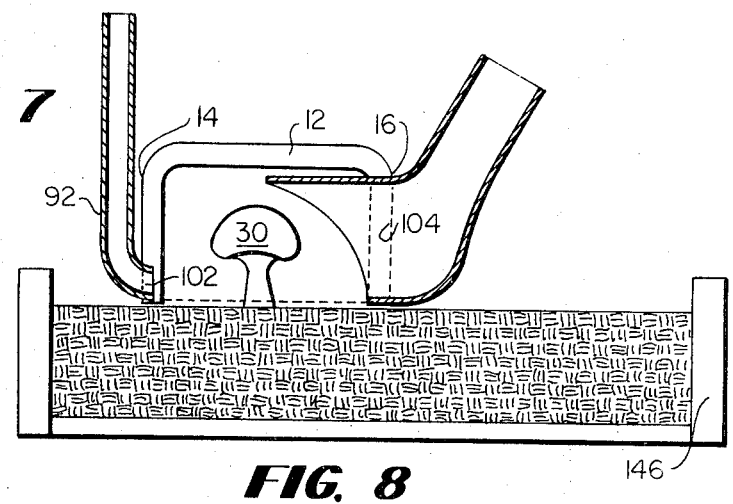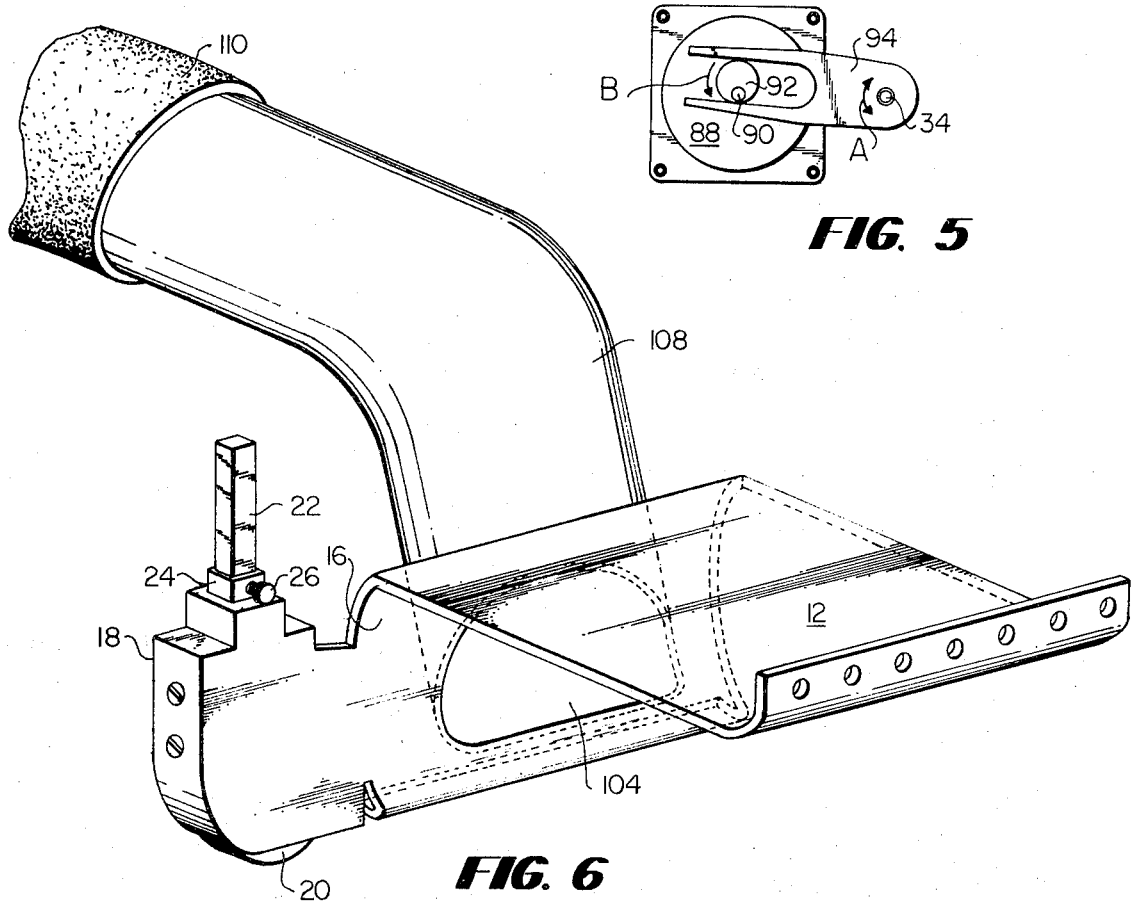

MUSHROOM HARVESTER

BACKGROUND OF THE INVENTION

In general, mushrooms are picked or harvested entirely by hand, which hand labor materially increases the cost of the product. Mechanized harvesting would make American production of mushrooms better competitive with the foreign production; however, the delicate nature of the mushroom has in the past prevented the development of a harvester which would not degrade the product.

THE INVENTION

The present invention is directed to a harvester for mushrooms which is adapted to sever the product adjacent the ground surface and to convey the severed product to collection means with substantially no damage to the delicate product.

A further object is to provide such a device that may be employed when harvesting tray-grown mushrooms or mushrooms grown by other conventional growing methods.

A further object is to provide such a device wherein relative motion between the harvester and the product may be brought about by moving the harvester relative to the product or by physically moving the trays or the like in which the product is grown relative to fixed harvesting machine.

These and other objects and advantages of the present invention are provided in a row harvester for mushrooms comprising an open-ended tunnellike housing having an opening width and height to freely permit a row of mushrooms to pass therethrough, a cutter blade mounted in the housing, and transversely thereof adjacent the surface of the ground, means for directing a stream of air from one sidewall of the housing adjacent the base of the product being severed, and suction means in the opposite sidewall of the housing for conveying the severed product to product collection means.

The invention will be more fully described in reference to the accompanying drawings wherein:

FIG. 2 is a partial sectional view through a mushroom collector associated with the harvester shown in FIG. 1;

FIG. 3 is a front end view of that portion of the machine illustrated in FIG. 4;

FIG. 4 is a longitudinal side elevational view of the motor and drive mechanism for the severing means of the harvester illustrated in FIG. 1;

FIG. 5 is an enlarged fragmentary view of the drive means between the motor and the oscillating arm for the cutter blade of the harvester;

FIG. 6 is an enlarged fragmentary perspective view of a portion of the housing and suction-conveying means for the harvester;

FIG. 7 is an enlarged perspective view of one of the means for directing a stream of air against the mushrooms being harvested; and FIG. 8 is a diagrammatic view of the apparatus of the invention harvesting a mushroom in a mushroom tray.

Figure 1:
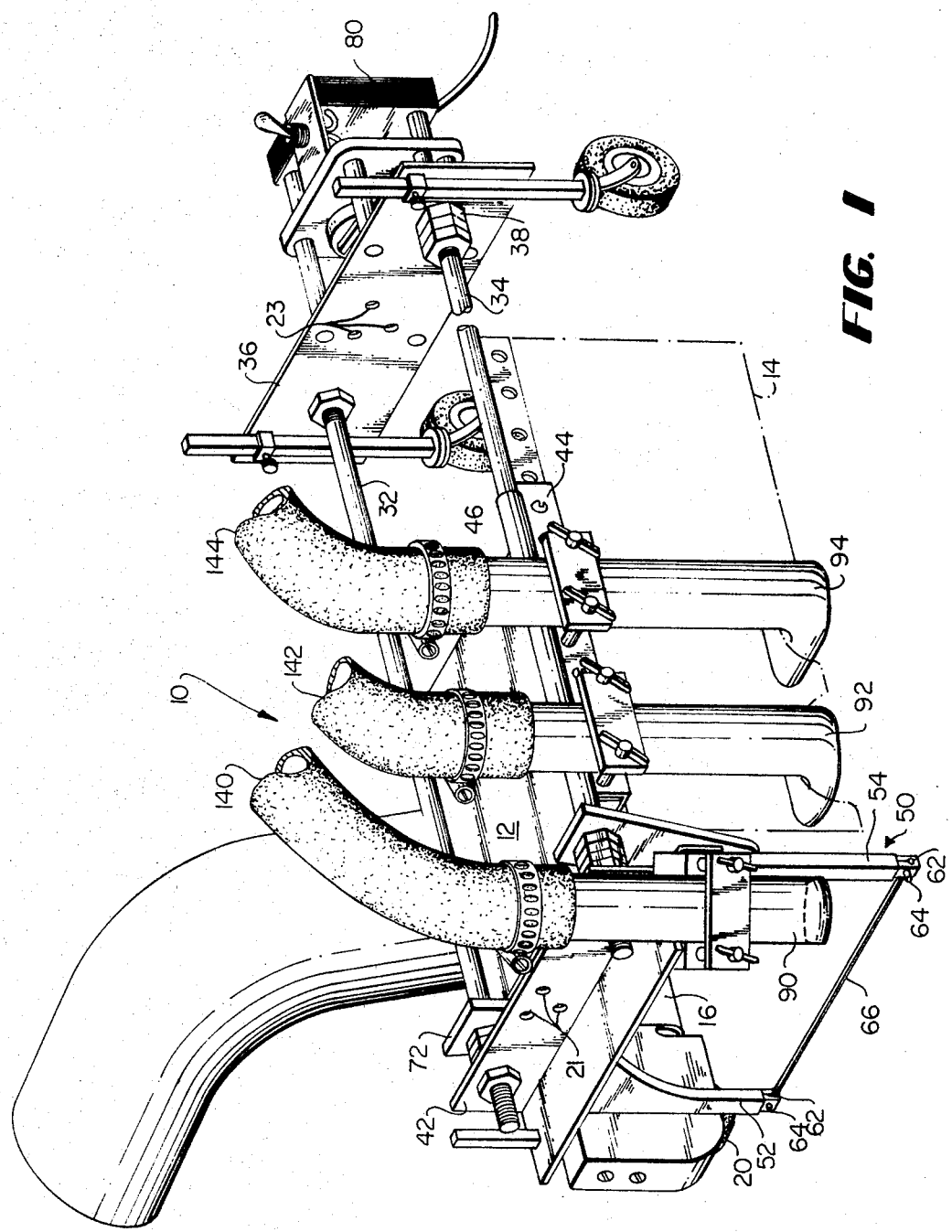
FIG. 1 is a fragmentary perspective view of an embodiment of the mushroom harvester of the present invention.

Referring to the drawing, and in particular FIGS. 1 through 4, 6 and 7, the harvester of the invention is generally designated 10 and includes a generally tunnel-shaped housing 11 composed of a top wall 12, sidewall 16 and where desired an opposite sidewall 14. As illustrated more clearly in FIG. 6, the top wall 12 and the sidewall 16 may be integrally formed with a further housing 18 which encloses all but the ground-engaging portion of a front stabilizing wheel 20. Wheel 20 is carried by a vertically extending shaft 22, which shaft may be raised relatively to the harvester housing 11 via a bushing 24 provided with a shaft-engaging setscrew 26, all as more clearly illustrated in FIG. 6.

The housing provided by at least sidewall 16 and top wall 12 forms a tunnellike structure, which tunnellike structure is sized to freely admit therethrough mushrooms such as illustrated at 30 in the diagrammatic showing in FIG. 8. A housing having an opening about 5½ inches wide and about 3 inches high has provided very satisfactory results and will harvest most conventional commercially grown mushrooms.

The housing is supported from a pair of longitudinal rails or rods 32 and 34, one of which is stationary while the other 34 oscillates as to be more fully described hereinafter. The stationary rail 32 is rigidly mounted to a backplate 36 while the oscillating rod 34 is rotatably mounted by suitable nuts and bushings 38 and 40 and similarly the forward end of the members 32 and 34 are mounted to a forward angle beam or plate 42, by nut 33 and bushings 35 respectively.

If a sidewall 14 is employed it may be suspended from a bracket 44, which bracket has a tubular upper portion 46 which freely receives the longitudinal rod 34 and while supporting the sidewall 14 permits oscillation of the rod. Mounted, preferably for oscillatory motion, at the forward end of the harvester is a cutter blade assembly generally designated 50. The cutter blade assembly 50 includes a pair of generally vertically extending sidearms 52 and 54, which are maintained in spaced generally parallel arrangement by a crossbeam 56 connected as at 58 to vertical arm 54 and as at 60 to vertical arm 52.

The lower end of each arm 52 and 54 is slotted as at 62 and provided with setscrew means whereby a blade 66 may be inserted and rigidly held between the lower extremities of the arms. The severing blade 66 may comprise a conventional fine-toothed jigsaw blade having, for example, 18 teeth per inch, a knife blade having a continuous cutting edge, or the like. Arm 52 of the cutter assembly is pivotally mounted via pin 70 to a pivot arm 72 which pivot arm is mounted for free oscillation on the longitudinal rod 32, as more clearly shown in FIGS. 1 and 3 of the drawings.

The opposite arm 54 is freely pivotally mounted to a drive arm 74 via pivot pin 76. Drive arm 74 is fixed to shaft or rod 34 by locknuts 78, more clearly shown in FIG. 4 of the drawings, whereby upon oscillation of the rod 34 arm 74 in turn oscillates and causes the blade 66 and its supporting arms 52 and 54 to reciprocate transversely across substantially the entire width of the opening forming the mouth of the tunnel-shaped housing.

The rod 34 is oscillated by an electric motor 80 having a switch 82, connected to a source of electric current through conductor 84. The rotating armature 86 of the motor 80 passes to a conventional reducing gear train maintained in housing 88. The output shaft of the gear train 90 has secured to its extended end a cam 92, which rotatably engages a driving fork 94. The extended end of the drive fork is secured to the rod 34, whereby the rod 34 is caused to oscillate as illustrated by the directional arrow A, FIG. 5, when the cam 92 is rotated as shown by directional arrow B, FIG. 5. Suitable oscillation for the knife or cutter blade 66 is provided when the diameter of the cam 92 is 1 inch and the eccentricity of the shaft 90, relative to the cam, is 0.25 inch, the distance between the center of shaft 90 and the oscillating shaft 34 is about 2 inches and the arm 74, which is driven by the extended end of shaft 34 is 2 inches between centers. Driving the motor such that the blade oscillates in the range of, for example, 3 to 10 Hz. produces satisfactory results; however, the lower frequency of oscillation was in general found to be preferably as the higher frequency oscillation had a tendency to cause the front supporting wheel to penetrate soft soil.

The assembly also includes at least one air-directing means and in the illustrated form of the invention three such air-directing means designated 90, 92 and 94 are shown. Air-directing means 90, 92 and 94 in an embodiment of the invention each comprise a tubular pipe having about 0.75-inch internal diameter and the discharge end thereof 96 was flattened to have a major diameter 98 of about 1.05 inches and a minor diameter 100 of about 0.35 inch.

Air-directing means 90 was oriented such that the force of the issuing airstream was directed adjacent the base of the mushrooms forwardly of the cutter knife 66 with the outlet nozzle 102 also directed generally toward the inlet for collected products 104, to be more fully described hereinafter. The other two air-detecting means 92 and 94 were oriented such that the output streams thereof were also directed toward the base of the mushrooms to be harvested and oriented toward the collected mushrooms inlet 104, as more clearly illustrated in the schematic drawing, FIG. 8.

As hereinbefore described, wall 16 has an inlet opening 104 for severed mushrooms, which inlet opening is connected to a tubular conduit 108, which in turn is connected via a flexible hose 110 to an expanding inlet spout 112 of a mushroom collector generally designated 114. The severed mushrooms are directed via spout 112 into the interior 116 of the collector by suction created by an exhaust fan assembly generally designated 118 mounted on the top wall 120 of the collector 114. The entering mushrooms pass over an open-mesh screen element 122, which screen element is positioned over a trash-collecting basket 124 having a combination front wall and door 126. While the trash is collected in the basket, the mushrooms entering the collector 114 decelerated by, for example, a sponge or cushion member 128 and thereafter roll into a box or basket 130, positioned in the base of the collector.

It has been found that the suction created by a conventional vacuum cleaner fan assembly has provided satisfactory results. It will also be noted that the flexible connecting conduit 110 has a diameter less than the inlet spout 112 to the collector whereby collected mushrooms are decelerated in the expanding nozzle 112 prior to entering the collector body proper. Further, the assembly includes means not shown for providing a compressed source of air for nozzles 90, 92 and 94 and each of the conduits 140, 142, and 144 connecting the nozzles 90, 92 and 94, respectively, to the source of compressed air, may be provided with control valves whereby the velocity and volume of the airstream issuing from the nozzle may be readily controlled.

While a specific form of air compressor has not been illustrated, satisfactory operation of the device illustrated in the drawings was provided by the output from a conventional vacuum cleaner fan and motor assembly.

In general, where the harvester of the present invention is to be employed in harvesting tray-grown mushrooms such as the tray 146, illustrated in FIG. 8 of the drawing, the trays are placed on a bed which is adapted to move relative to the harvester, which harvester remains in a stationary position simplifying the flexible connections between the collector and the harvester and the source of the compressed air and harvester. However, it will be appreciated by those skilled in the art that the harvester including, for example, its collector and sources of compressed air and suction, may be suspended and reciprocated either by hand or by suitable motor means over a bed of mushrooms or a stand holding the mushroom tray stationary. The reciprocating means may comprise an air or hydraulic ram, one end of which is connected to the harvester via bores 21 and 23 and the other end to a stationary frame positioned above the platform supporting the tray of mushrooms to be harvested.

I claim:

1. A harvester for mushrooms comprising an open-ended tunnellike housing having two sidewalls and an opening width and height to freely permit a row of mushrooms to pass therethrough; an elongated cutter blade, means mounting said cutter blade to said housing at its forward end for oscillatory motion, said motion generally approaching a plane parallel to and close to the surface of the ground, means for oscillating the cutter blade; means mounted on said housing for directing a stream of air from one sidewall of the tunnellike housing toward said opposite sidewall, mushroom collection means, an opening in said opposite sidewall of the tunnellike housing, conduit means connecting said collection means and said opening in said opposite sidewall and suction production means connected to, said collection means.

2. The invention defined in claim 1 including a plurality of airstreams directed from said one sidewall of the housing.

3. The invention defined in claim 2 wherein one of the means for directing a stream of air from one sidewall of the housing is mounted forwardly and to said one side of the cutter blade and another of the means for directing a stream of air from said one sidewall of the housing is positioned opposite to said opening in the opposite sidewall and directed thereto.

4. The invention defined in claim 3 wherein plural airstreams are directed transverse of the housing toward the said opening in the opposite sidewall.

* * * * *